Nov. 20, 1962    C. K. HUTHSING, JR    3,064,991
WHEELED CART FOR CONVEYING A TANK OR CYLINDER
Filed July 15, 1959
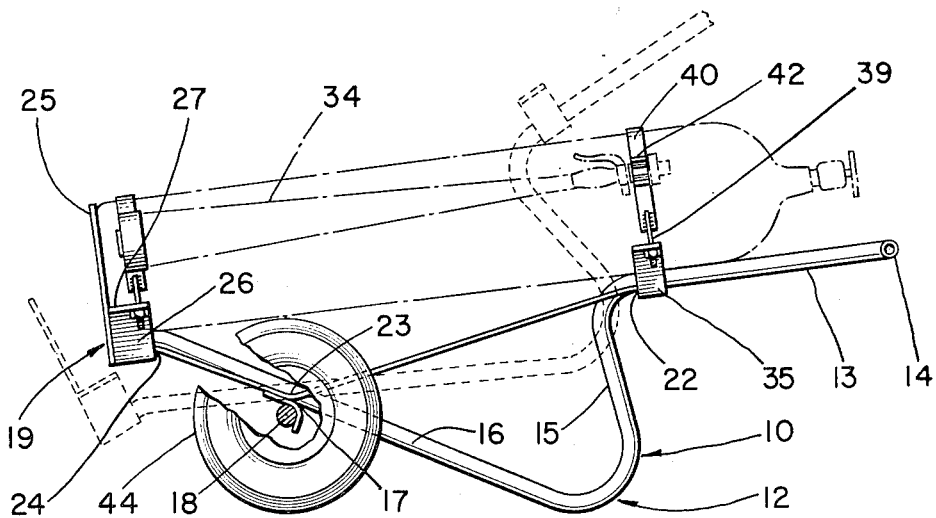
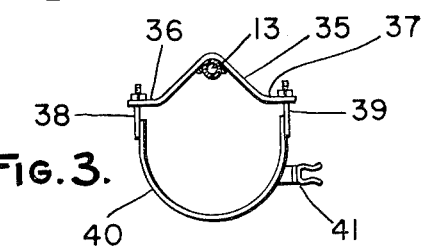
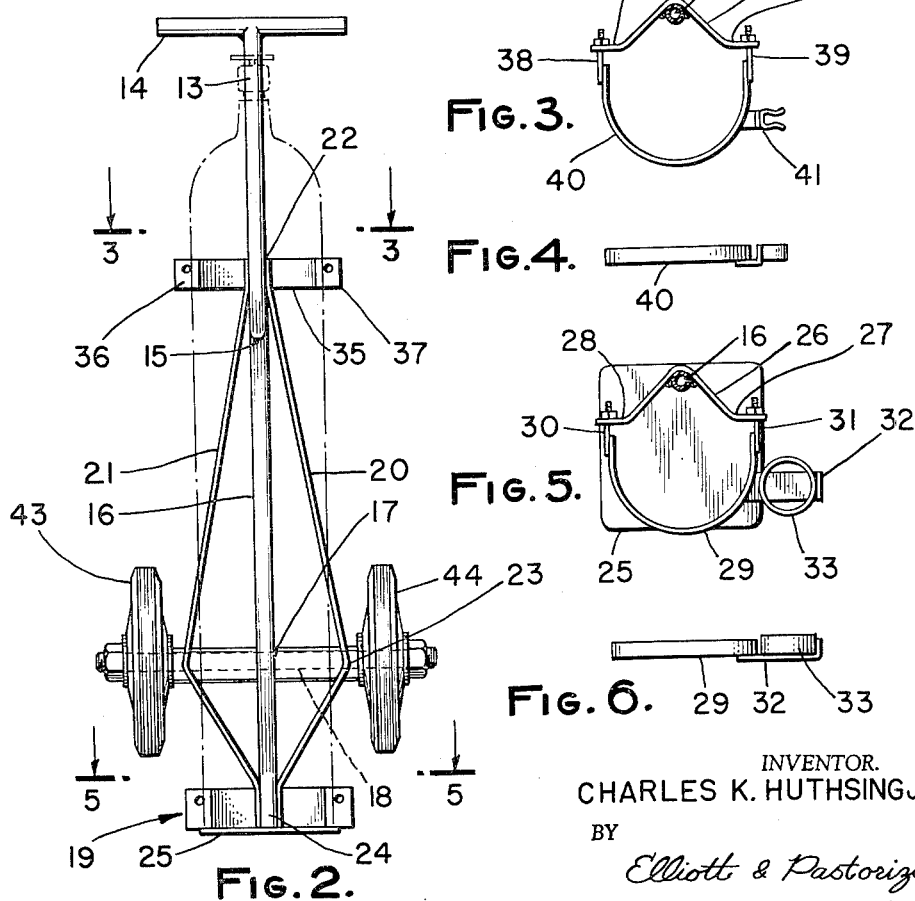
INVENTOR.
CHARLES K. HUTHSING JR
BY
Elliott & Pastoriza
ATTORNEYS

United States Patent Office 3,064,991
Patented Nov. 20, 1962

3,064,991
WHEELED CART FOR CONVEYING A TANK
OR CYLINDER
Charles K. Huthsing, Jr., 1685 Shermer Road,
Northbrook, Ill.
Filed July 15, 1959, Ser. No. 827,403
4 Claims. (Cl. 280—47.24)

This invention generally relates to a wheeled cart for conveying a tank or cylinder advantageously employed for portable fire extinguishing apparatus and more particularly concerns an improved construction for a fire extinguisher tank carrier or cart.

An object of the present invention is to provide an improved fire extinguisher tank cart which may be economically constructed with a minimum amount of material and labor and yet which will be susceptible of rugged usage throughout a long period of life.

Another object of the present invention is to provide an improved fire extinguisher tank cart which embodies an all welded construction characterized by a single integral main frame member.

Another object of the present invention is to provide an improved fire extinguisher tank cart which is designed such that it may retain a fire extinguisher tank stably in either a generally horizontal or generally vertical position.

Another object of the present invention is to provide an improved fire extinguisher tank cart which with minor adjustments will accommodate various diameter tanks.

Still another object of the present invention is to provide an improved fire extinguisher tank cart which is designed to securely couple a fire extinguisher tank thereto and yet which enables convenient removal of the tank and replacement thereof if required.

These and other objects and advantages of the present invention are generally achieved by providing a fire extinguisher tank cart comprising an axle on which are journaled a pair of spaced wheels. A single tubular frame member is rigidly secured to the axle centrally of the wheels and extends forwardly and rearwardly of the axle. Tank support means are coupled to the frame member forwardly of the axle, and tank retaining means are coupled to the frame member rearwardly of the axle. It is desirable that the tank support means also include auxiliary tank retaining means. Preferably, brace means are employed to stabilize the frame member relative to the axle.

A better understanding of the present invention will be had by reference to the drawings merely showing an illustrative embodiment and in which:

FIGURE 1 is a side elevational view of the improved fire extinguisher tank cart according to the present invention with a tank positioned thereon, and illustrating the tank cart in a non-operative position by the solid lines and in a transporting position by the dotted lines;

FIGURE 2 is a front elevational view of the tank cart in its standing position as it would be during operational use without the tank or tank retaining means or straps;

FIGURE 3 is a view taken in the direction of the arrows 3—3 of FIGURE 2 illustrating a top view of the tank retaining means without showing other parts of the cart.

FIGURE 4 is a side elevational view of the tank retaining means of FIGURE 3;

FIGURE 5 is a view taken in the direction of the arrows 5—5 of FIGURE 2 illustrating the tank supporting means without showing the brace means; and, FIGURE 6 is a side elevational view of the tank supporting means as shown in FIGURE 5.

Referring now to the drawings, there is shown in FIGURE 1 a fire extinguisher tank carrier or cart 10 on which is mounted a fire extinguisher tank 11 of relatively conventional construction.

The cart 10 embodies, according to an important feature of the present invention, a single integral frame member 12, preferably of tubular construction. The frame member 12 includes an outer rectilinear portion 13 which terminates at its free end in a handle 14, preferably welded to the portion 13, as shown in FIGURE 2.

The frame member 12 also embodies an S-shaped portion 15 which interconnects the inner end of the rectilinear portion 13 and the outer end of another rectilinear portion 16.

The rectilinear portion 16 extends forwardly and rearwardly from a point 17 to which it is rigidly secured to the axle 18, preferably by welding.

The inner end of the rectilinear portion 16 terminates in a base member generally designated by the numeral 19, which functions as tank supporting means particularly when the cart, according to the present invention, is disposed in the upright or transporting position.

In order to make the cart more rugged and to firmly structurally stabilize the frame member 12, brace members 20 and 21 as clearly shown in the view of FIGURE 2 are provided. The brace members 20 and 21 are of identical construction and are positioned in opposing relationship. The brace member 20 has a short length thereof parallel to and securely welded at 22 to the portion 13 of the frame 12, at 23 to the axle 18, and also has a short length thereof parallel to and securely welded at 24 to the angle member 19. The brace member 21 is similarly rigidly secured to the portion 13 of the frame, the axle 18, and the tank supporting structure 19.

The tank supporting structure 19, as such embodies a plate portion 25 sufficiently large in area to adequately support the base of tank 11 as clearly shown in the view of FIGURES 1 and 5. The plate portion 25 has extending upwardly at right angles thereto, an angled member 26 as seen in the view of FIGURE 5, which includes terminal portions 27 and 28. The angled member 26 is constructed to be rigidly secured by welding or the like at its apex to the frame portion 16.

The terminal portions of the angled member 26 are provided with apertures for coupling to auxiliary tank retaining means or a tank holding strap 29, the latter including bolts 30 and 31 secured thereto for connection through the apertures provided in the terminal portions 27 and 28. The tank holding strap 29 additionally embodies an arm member 32 extending outwardly therefrom on which is mounted a cylindrical member 33. As shown in the view of FIGURE 1, the cylindrical member 33 is adapted to receive a horn 34 used in conjunction with the conventional fire extinguisher tank 11. The cylindrical member 33 is properly dimensioned to accommodate the larger end of the horn 34 as shown.

The tank retaining means 29 employed in conjunction with the tank holding means 19 co-operates with main tank retaining means connected to the rectilinear portion 13. Thus, an angled member 35, of similar construction to the angled member 26 (as more clearly shown in the view of FIGURE 3), has its apex rigidly secured as by welding, to the frame portion 13. Similarly, the angled member 35 is provided with side portions 36 and 37 adapted to receive bolts 38 and 39. The bolts 38 and 39 are in turn connected to a tank strap 40 which is received about the extinguisher tank 11. The tank strap 40 has extending therefrom a spring clip means 41 which is adapted to retain a hose coupling 42, as more clearly shown in the view of FIGURE 1.

Wheels 43 and 44 are provided to enable portability of the tank cart and may be rotatably coupled to the axle 18 in a conventional manner.

In its usual non-operative position, the fire extinguisher is disposed according to the solid line view of FIGURE 1. In this position, the S-shaped portion 15 of the frame 12 enables the cart 10 to stand substantially horizontally on the ground. During transporting or movement of the fire extinguisher to fire locations or for standby use in conjunction, for example, with aircraft engine starting, it is merely necessary to lift the frame 12 to the dotted line position of FIGURE 1. When the fire extinguisher is to be used, it is normally disposed in its upright position of FIGURE 2, in which position the cart 10 will be stable.

It will be appreciated that many modifications and changes may be made to the improved fire extinguisher cart construction as shown and described in accordance with the knowledge of those skilled in the art without departing from the spirit and scope of the invention.

What is claimed is:

1. A fire extinguisher tank cart comprising: an axle; a pair of spaced wheeled journaled on said axle; a single tubular frame member including a first rectilinear portion rigidly secured to an upper portion of said axle centrally of said wheels and extending forwardly and rearwardly of said axle, said frame member being pivotable with respect to said wheels from a substantially horizontal position to a substantially vertical position, said frame member further including an S-shaped portion substantially normal to the plane defined by said axle and said first portion, said S-shaped portion having one end thereof integrally connected to the end of said first rectilinear portion disposed rearwardly of said axle, and said frame member also including a second rectilinear portion integrally connected to the other end of said S-shaped portion, said S-shaped portion when said frame member is disposed in said horizontal position joining said first rectilinear portion at a point substantially vertically below the point said S-shaped portion joins said second rectilinear member; tank support means connected to the end of said first rectilinear portion forwardly of said axle; tank retaining means connected to said second rectilinear portion; and, a pair of opposing brace members, each of said brace members having a short length of one end portion in parallel secured relationship to the end of said first rectilinear portion forwardly of said axle, each of said brace members having a short length thereof of its opposite end portion in parallel secured relationship to said second rectilinear portion at the point that said tank retaining means are connected to said second rectilinear portion, and each of said brace members having an intermediate portion rigidly secured to an upper portion of said axle in spaced relationship to the connection of said first rectilinear portion to said axle.

2. A fire extinguisher tank cart, according to claim 1, in which said first rectilinear portion is at right angles to said axle.

3. A fire extinguisher tank cart, according to claim 2, and fire extinguisher tank horn supporting means connected to said tank supporting means.

4. A fire extinguisher tank cart, according to claim 3, and fire extinguisher hose retaining means connected to said tank retaining means.

References Cited in the file of this patent

UNITED STATES PATENTS

| | | |
|---|---|---|
| D. 182,298 | McGrath | Mar. 11, 1958 |
| 977,056 | Verplanck | Nov. 29, 1910 |
| 2,236,053 | Caron | Mar. 25, 1941 |
| 2,661,982 | Hudson | Dec. 8, 1953 |
| 2,741,490 | Chamberlin | Apr. 10, 1956 |

FOREIGN PATENTS

| | | |
|---|---|---|
| 455,090 | Canada | Mar. 8, 1949 |
| 1,005,380 | Germany | Mar. 28, 1957 |